A. E. ROSE.
MEAT CHOPPER.
APPLICATION FILED JUNE 22, 1915.
1,207,632.
Patented Dec. 5, 1916.
2 SHEETS—SHEET 2.
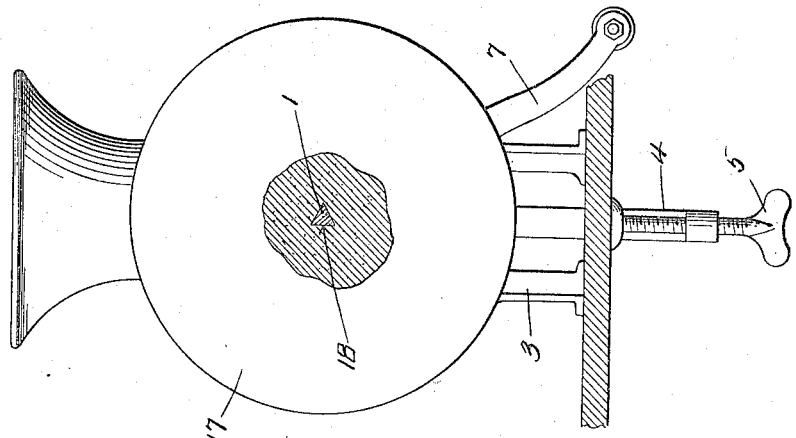
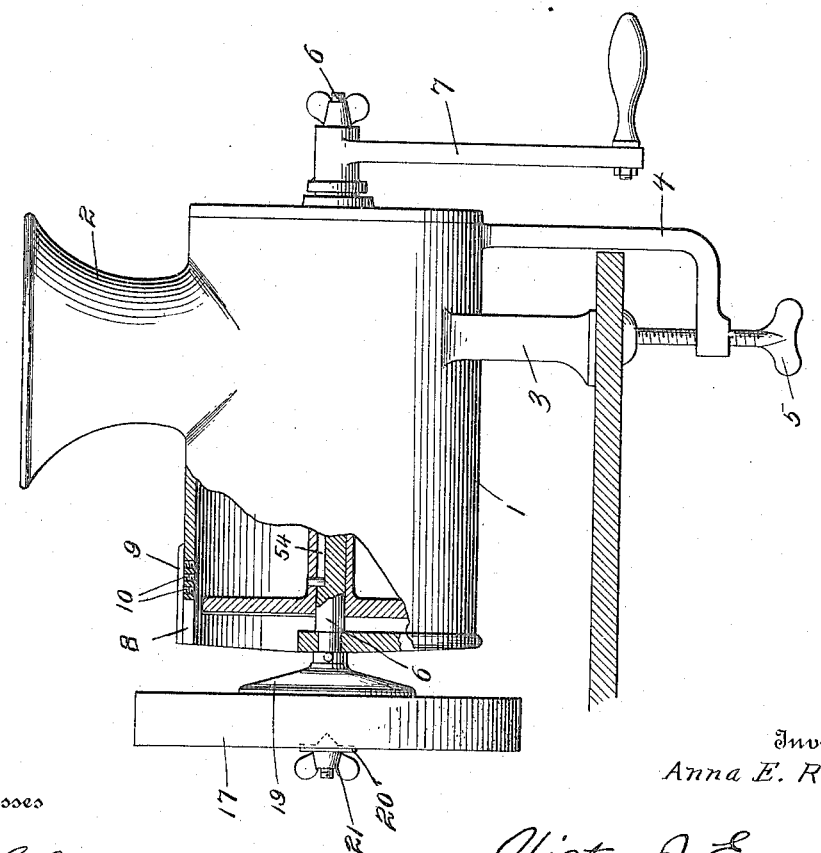
Inventor
Anna E. Rose
Witnesses
A. C. Newkirk
By Victor J. Evans
Attorney

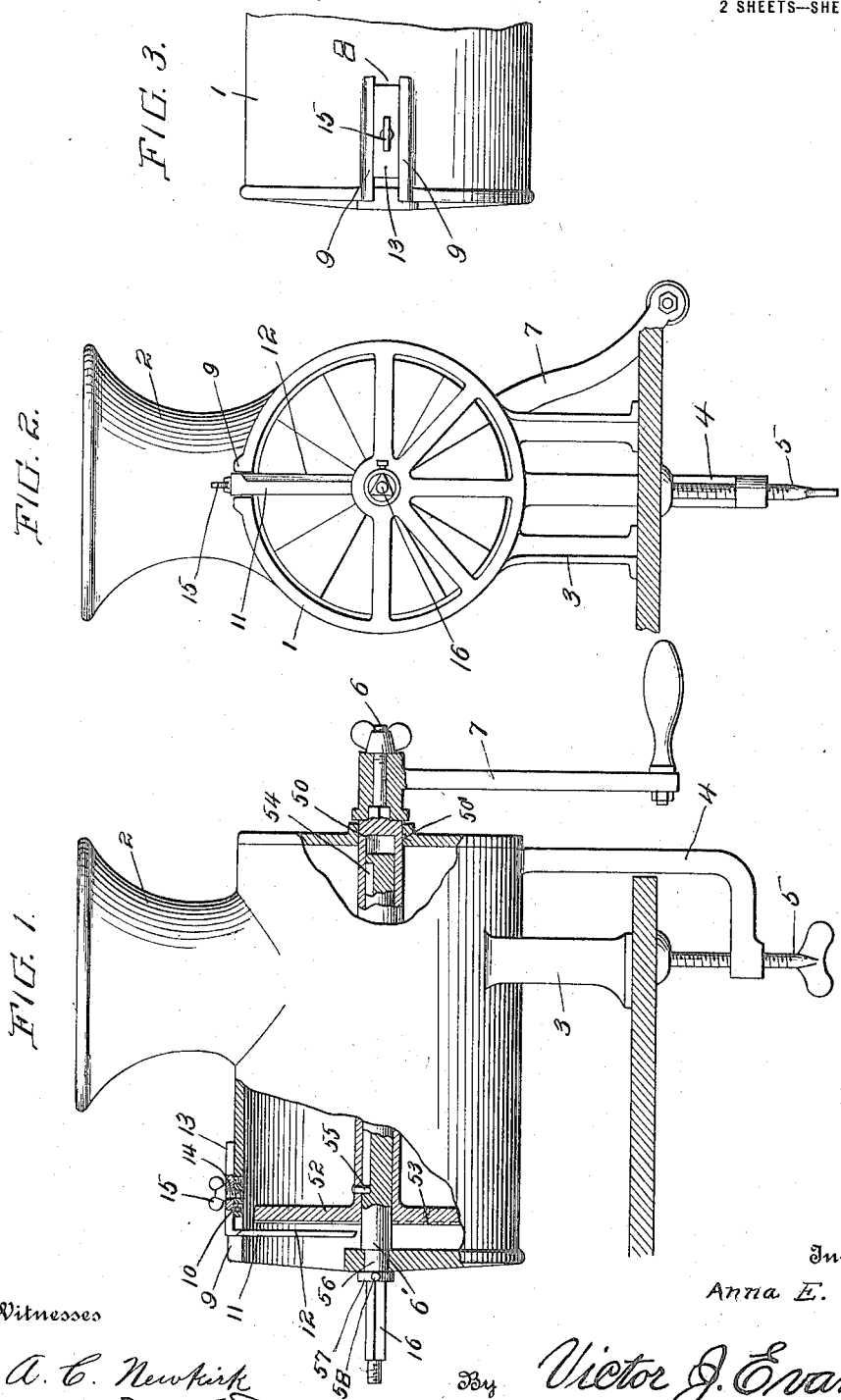

UNITED STATES PATENT OFFICE.

ANNA E. ROSE, OF GENEVA, NEW YORK.

MEAT-CHOPPER.

1,207,632. Specification of Letters Patent. Patented Dec. 5, 1916.

Application filed June 22, 1915. Serial No. 35,591.

*To all whom it may concern:*

Be it known that I, ANNA E. ROSE, a citizen of the United States, residing at Geneva, in the county of Ontario and State of New York, have invented new and useful Improvements in Meat-Choppers, of which the following is a specification.

This invention relates to improvements in meat chopping machines, and especially has reference to improvements in the construction of the cylinder of the meat chopper and the provision of a knife adapted to be detachably and adjustably secured on the cylinder and arranged at the discharge end thereof, for cutting meats and the like; the object of the invention being to effect improvements in the means for contacting the article to be chopped with the knife, while still another object of the invention is to improve the construction of the shaft of the meat chopping machine and to combine therewith a grind stone and means for detachably securing the grind stone to the rear end of the shaft, so that the machine may be used for grinding knives and the like as well as for chopping or cutting meats and other articles.

The invention further consists in the construction, combination and operative arrangement of devices hereinafter described and claimed.

In the drawings, in which there is illustrated a simple and satisfactory reduction of the improvement to practice, Figure 1 is a side elevation, partly in section, of a chopping machine having the cylinder thereof provided at its discharge end with a detachable cutting knife, in accordance with my invention; Fig. 2 is a rear elevation of the same; Fig. 3 is a detail plan view showing a portion of the cylinder and also showing the knife; Fig. 4 is a side elevation, partly in section, of the chopper, the cutting knife being removed, and with a grind stone attached to the rear end of the shaft; and Fig. 5 is a rear elevation, partly in section, of the cylinder.

For the purpose of this specification a chopping machine is herein shown, the cylinder being indicated at 1, the feed hopper at 2, the supporting standard at 3 and the clamping angle arm being indicated at 4 and provided with a clamping screw, as at 5, for securing the chopper on a table or other support.

In accordance with my invention I provide the cylinder 1, at its upper side, at the discharge end, with a depression or opening 8 that communicates with the interior of the cylinder, and arranged at the opposite longitudinal walls provided by the said depression 8 are flanged walls 9. The portion of the cylinder between the flanges 9 is provided with threaded openings 10 which are spaced a suitable distance apart. I also provide a cutting knife 11 for arrangement at the discharge end of the cylinder and radially with respect to the cylinder, said cutting knife having a beveled sharpened edge 12 on one side and being provided at its upper end with an arm 13 which is adapted to be adjusted longitudinally upon the cylinder between the flanges 9. The arm 13 has an opening 14 which is arranged to register with any of the openings 10, a clamping screw 15 being also provided for engagement with the threads of the said opening and to detachably secure the knife to the cylinder at any desired adjustment. The thickness of the slices cut by the knife will be regulated by the adjustment of the knife, as will be understood.

The discharge end of the hopper is provided with a central bearing member for the reduced portion 56 of a shaft 6', the said bearing member being connected with the hopper by radially disposed arms. The shaft 6' is for the major portion of the length thereof disposed in the hopper provided with a groove 54, while its outer end is formed with a spindle 16 shaped to receive a polygonal opening 18 centrally arranged in a grindstone 17. A spacer bell 19 is disposed between a collar 57 (that is secured upon the spindle 16 by a pin 58) and the said grindstone, while a thumb nut 21 engages with a threaded extension on the spindle and contacts with the opposite face of the grindstone. The thumb nut contacts with a washer 20.

The shaft 6' terminates adjacent the closed end of the hopper and has journaled thereon a hollow shaft 50 having one of its ends provided with a presser head 52. This head 52 has its outer face formed with spaced radially disposed integral fingers 53 which are arranged adjacent the inner face of the knife 11. The hollow shaft 50, to the rear of the head 52, is provided with a lug or pin 55 which is arranged in the slot 54 of the shaft 6', and this lug or pin contacting with the shoulders provided at the opposite ends of the slot 54 limits the sliding movement of the head toward or away from the knife. The hollow shaft 50 is arranged in a bearing opening 50' in the closed end of the hopper and is provided with a threaded extension 6 to be received in an opening in one of the ends of a crank handle 7, suitable means, such as a nut, being employed for holding the shaft upon the said extension.

In operation, the head 52 is brought toward the closed end of the hopper and the meat or other food is fed through the mouth 2 of the hopper into the cylindrical portion thereof. The shaft, through the medium of pressure upon the handle 7 is moved longitudinally to compress the food toward the knife at the outlet end of the hopper and by revolving the hollow shaft the head 52, through the medium of its fingers 53 will revolve the food against the knife. As the knife is adjustable toward or away from the head 52, the food may be sliced into different sizes, the extent of the pressure of the head toward the knife regulating the thickness of the cuts.

It is to be understood that the knife and grindstone are detachable so that either may be used independent of the other, but the inner face of the grindstone when positioned upon the device may also serve to direct the chopped food from the mouth of the hopper.

Having thus described my invention, I claim:

1. A food chopper including a cylindrical casing, a knife arranged radially in the casing at the discharge mouth thereof, a longitudinally extending shaft journaled in a bearing in the said discharge end of the casing and held thereby against longitudinal movement, a hollow shaft journaled upon the first mentioned shaft, the closed end of the casing having a bearing opening through which the said hollow shaft extends, a head on one end of the hollow shaft disposed opposite the knife, said head having integral fingers upon its outer face, and an operating handle for the hollow shaft.

2. In a food chopper, a cylindrical casing having a bearing opening in the discharge end thereof, a shaft arranged longitudinally in the casing and having a reduced portion received in the bearing opening, said shaft for the major portion thereof being formed with a longitudinally extending slot, the closed end of the casing having a bearing opening, a hollow shaft arranged within said opening and receiving the first mentioned shaft, an operating handle upon the outer end of the hollow shaft, a round head formed on the inner end of the said hollow shaft, said head having its face provided with radially disposed fingers, a knife member adjustably connected with the casing and disposed adjacent the said head of the hollow shaft, and a lug member upon the hollow shaft and received in the referred to groove in the first mentioned shaft to permit the sliding movement of the hollow shaft upon the first mentioned shaft and to connect the shafts.

In testimony whereof I affix my signature in presence of two witnesses.

ANNA E. ROSE.

Witnesses:
 Wm. M. Fink,
 Ethel M. Bloom.